No. 824,797. PATENTED JULY 3, 1906.
J. M. LANSDEN, Jr.
VEHICLE WHEEL.
APPLICATION FILED OCT. 14, 1904.
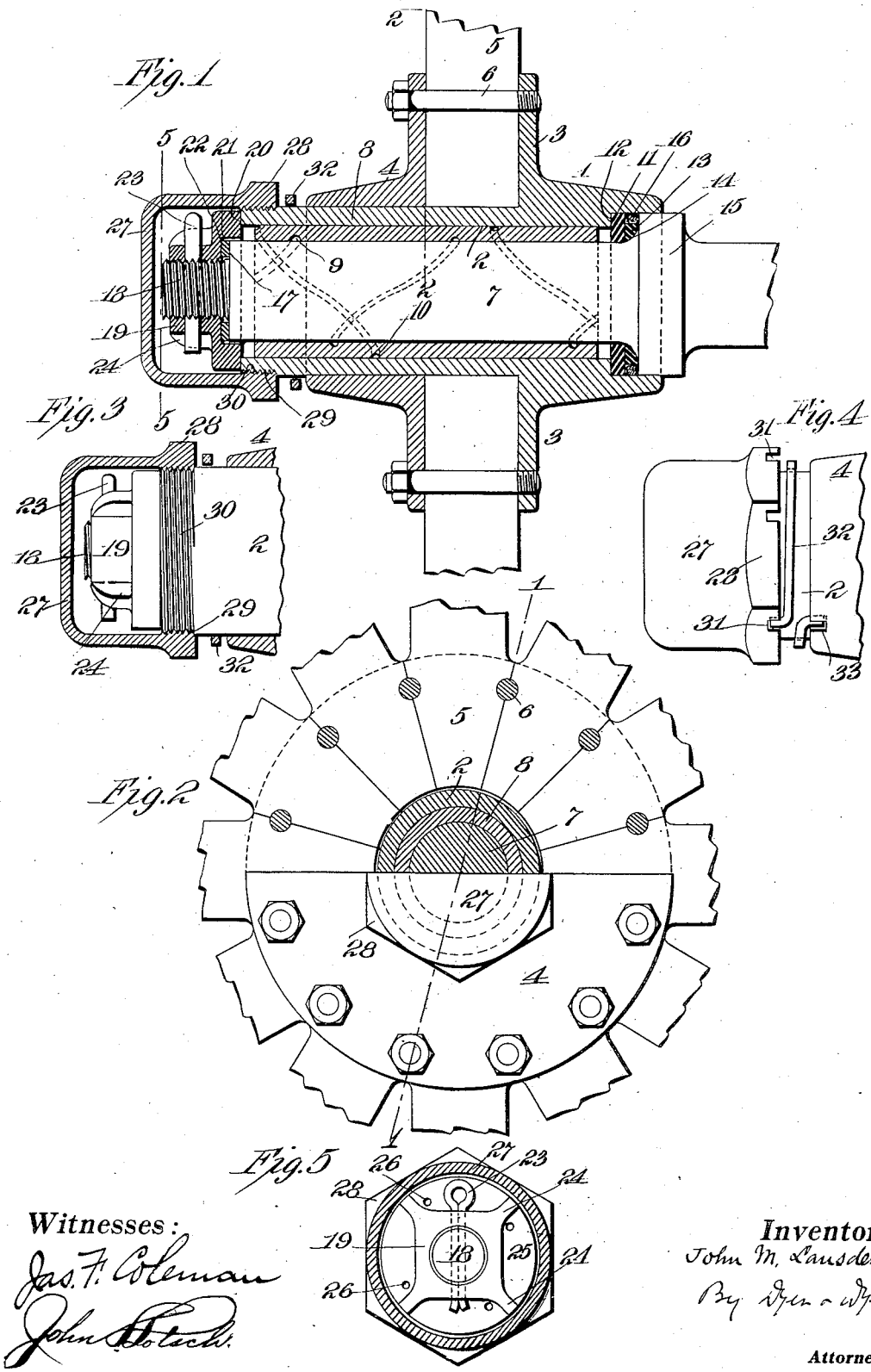
Witnesses:
Jas. F. Coleman
John A. —
Inventor
John M. Lansden, Jr.
By Dyer & Dyer
Attorneys.

UNITED STATES PATENT OFFICE.

JOHN M. LANSDEN, JR., OF ORANGE, NEW JERSEY.

VEHICLE-WHEEL.

No. 824,797.  Specification of Letters Patent.  Patented July 3, 1906.

Application filed October 14, 1904. Serial No. 228,417.

*To all whom it may concern:*

Be it known that I, JOHN M. LANSDEN, Jr., a citizen of the United States, residing in Orange, county of Essex, State of New Jersey, have invented certain new and useful Improvements in Vehicle-Wheels, of which the following is a specification.

The object I have in view is to produce a wheel suitable for vehicles, but particularly automobiles, whereby the friction will be reduced, lubrication will be effected, dust excluded, and the end cap retained securely in place. I attain these objects by the mechanism illustrated in the accompanying drawings, in which—

Figure 1 is a sectional view of a hub taken on the line 1 1 of Fig. 2. Fig. 2 is a view, partly in section, taken on the lines 2 2 of Fig. 1. Fig. 3 is an end view of the outer portion of the hub, showing the cap in section. Fig. 4 is a plan view of the same. Fig. 5 is a sectional view taken on the lines 5 5 of Fig. 1.

In all of the views like parts are designated by the same numerals of reference.

In carying out my invention I provide a hub 1, having a cylindrical bearing-surface 2 and a flange 3. Surrounding the hub is a flanged collar 4, and between this collar and the flange 3 are secured the spokes 5 by means of bolts 6. Between the bearing-surface 2 and the spindle 7 is a bushing or sleeve 8. This bushing 8 is free to rotate upon the spindle 7 and within the hub 1. The inner surface of the bushing is provided with two or more longitudinal spiral oil-passages 9, and its outer surface is provided with similar passages 10. The passages on the inside of the bushing are arranged in the opposite direction from those in the outside—that is to say, if the passage 9 is a right-hand passage then the passage 10 on the outside will be a left-hand one, causing the passages to be of opposite twist.

A ring 11 of fiber is arranged on the inner end of the hub and bears against a shoulder 12, formed thereon. Engaging with the ring 11 is a second ring 13 of fiber, which bears against the inclined portion 14 of the axle-shoulder 15. The ring 13 is of less depth than the ring 11. Outside of the ring 13 is a ring 16, of felt or similar material. These rings constitute a dust-excluding device.

The outer extremity of the spindle 7 is reduced, forming a shoulder 17. The reduced portion is threaded at 18 for the reception of an end cap 19, the said cap being screwed thereto. The cap 19 is provided with a circular face portion 20, which bears against the hub 2 and a shoulder portion 21, adjacent to the shoulder 17 at the spindle. Between these two portions is a washer 22, of any suitable material. The end cap 19 is prevented from accidentally turning by means of a cotter 23. The end cap is adjusted until it pinches the washer 22. The circular face portion 20 will then engage with the hub and force the latter inward. This will compress the washers 11 and 13, and the latter engaging with the curved portion 14 of the enlargement 15 on the axle will be expanded, compressing the felt washer 16 between it and the hub, thereby producing an efficient dust-excluding device and a means for preventing escape of oil. The degree of compression of the felt ring 16 can be determined by the thickness of the washer 22, a greater or lesser thickness of the latter being employed, as required. The cap 19 is provided with wings 24, which with the barrel and flange of the cap constitute oil-chambers 25. An oil-passage 26 in each chamber serves as a means of communication between the space between the axle and the hub and the outside of the cap.

A cylindrical dust-cap 27, having a hexagonal portion 28 for attachment of a wrench and a threaded portion 29, engages with threads 30, formed upon the hub 1. This dust-cap forms an oil-tight joint by means of these threads and also serves as a reservoir for lubricant. The inner edge of the cap is provided with a series of notches 31, which engage with one extremity of a spring 32, the other extremity of the latter engaging with a notch 33, formed upon the flange 4. The spring is formed of wire of square or rectangular cross-section, so that it will not roll. The convolutions of the spring turn in the opposite direction from the threads 30—that is to say, if the threads 30 are right-handed threads the spring must be a left-handed one.

In order to get the best results from the bearing-surfaces, the spindle, hub, and bushing should be of different material and the thickness of the bushing should bear a definite relation to the frictional character of the materials. If, as an instance, as I have found in practice, the hub be made of malleable iron and the spindle of steel, the bushing made of bronze and softer than the spindle or hub, and the half-diameter of the spindle being seven-eighths of an inch and the half-diameter of the central bore of the hub being one and one-eighth inches, leaving the separating-space one-fourth of an inch and the bushing of sufficient thickness to make a close fit, and the parts being properly lubricated, the surfaces between the hub and bushing and between the bushing and the spindle will each have the same frictional characteristics—that is to say, the friction will be transferred to both surfaces in about equal amounts and the bushing will rotate at less speed than the hub. This will greatly reduce the friction and will double the oil area. The hub being rotated will supply oil by means of the cover 27 to the uppermost oil-chamber 25, allowing oil to pass through the passage 26 into the space between the spindle and the hub. The bushing being in constant rotation with the wheel, the oil will be moved through one of the spiral passages 9 or 10 into the bushing in one direction and return in the other direction, passing out through the lowermost oil-passage 26 into the dust-cap 27. It is to be noted that the bushing is free to move longitudinally upon the spindle to a limited extent; but it cannot pass beyond the confines of the cap 19 and the ring 11. By coiling the spring 32 in the opposite direction from the threads 30 an efficient lock for the cap 27 will be produced, as the lock cannot be unscrewed without compressing the spring. In order to remove the cap, one extremity of the spring is disengaged from the notch by the insertion of a suitable tool. This form of lock avoids the necessity of making an opening in the cap, as has heretofore been the case, and provides something that is neat and inconspicuous and which will not readily get out of order.

The specific oiling device disclosed herein is not claimed in this application, but forms the subject-matter of a divisional application filed by me on the 23d day of June, 1905, Serial No. 266,545.

Having now described my invention, what I claim as new, and desire to secure by Letters Patent, is—

1. In a vehicle-wheel, the combination with a spindle having a shoulder thereon, of a hub having a shoulder, fiber rings between the shoulders and a ring of softer material between the shoulders, and means for compressing the fiber rings between the shoulders, and for expanding the softer ring.

2. In a vehicle-wheel, the combination with a spindle, of a hub surrounding the same, a flaring shoulder on the spindle, a shoulder on the hub, a washer bearing against the hub-shoulder, a washer bearing against the flaring shoulder and the first washer, and means for expanding the second washer.

3. In a vehicle-wheel, the combination with a spindle, of a hub surrounding the same, a flaring shoulder on the spindle, a shoulder on the hub, a washer bearing against the hub-shoulder, a washer bearing against the flaring shoulder and the first washer, and of less diameter than the first washer, and a ring of soft material surrounding the second washer, and means for expanding the second washer.

4. In a vehicle-wheel, the combination with a spindle, of a hub surrounding the same, a flaring shoulder on the spindle, a shoulder on the hub, a washer bearing against the hub-shoulder, a washer bearing against the flaring shoulder and the first washer, but of less diameter than the first washer, and a ring of softer material surrounding the second washer, and means for expanding the ring into contact with the base of the hub.

This specification signed and witnessed this 29th day of September, 1904.

JOHN M. LANSDEN, JR.

Witnesses:
DAVID S. LANSDEN,
JAS. F. COLEMAN.